July 6, 1937.                D. J. CAMPBELL                2,085,727
                               BRAKE DRUM
           Original Filed Feb. 2, 1931      3 Sheets-Sheet 1
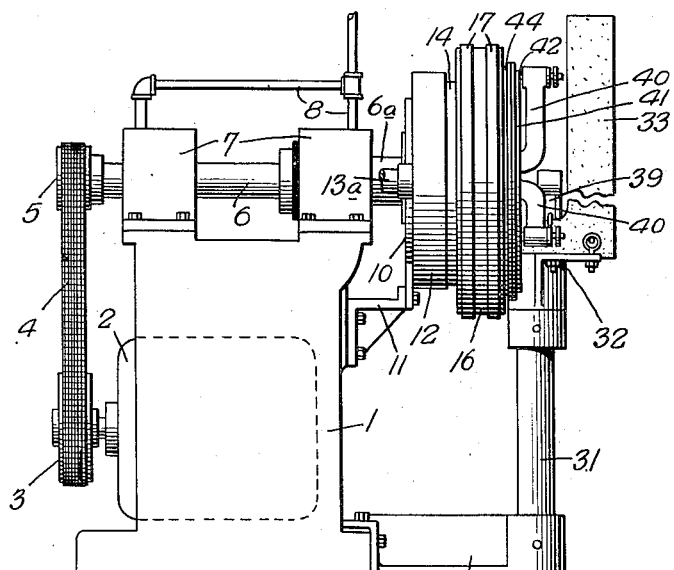
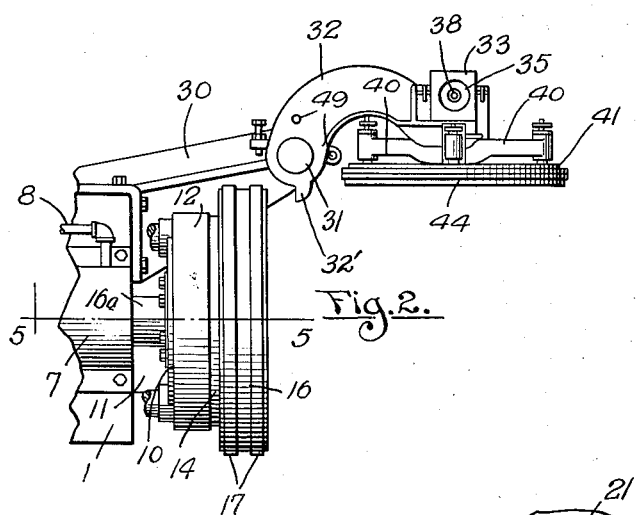
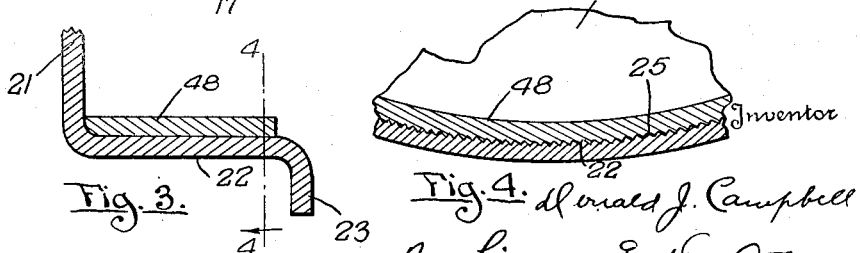

July 6, 1937.    D. J. CAMPBELL    2,085,727
BRAKE DRUM
Original Filed Feb. 2, 1931    3 Sheets-Sheet 2

Inventor
Donald J. Campbell
By Livance & Van Antwerp
Attorneys

July 6, 1937.　　　D. J. CAMPBELL　　　2,085,727
BRAKE DRUM
Original Filed Feb. 2, 1931　　3 Sheets-Sheet 3
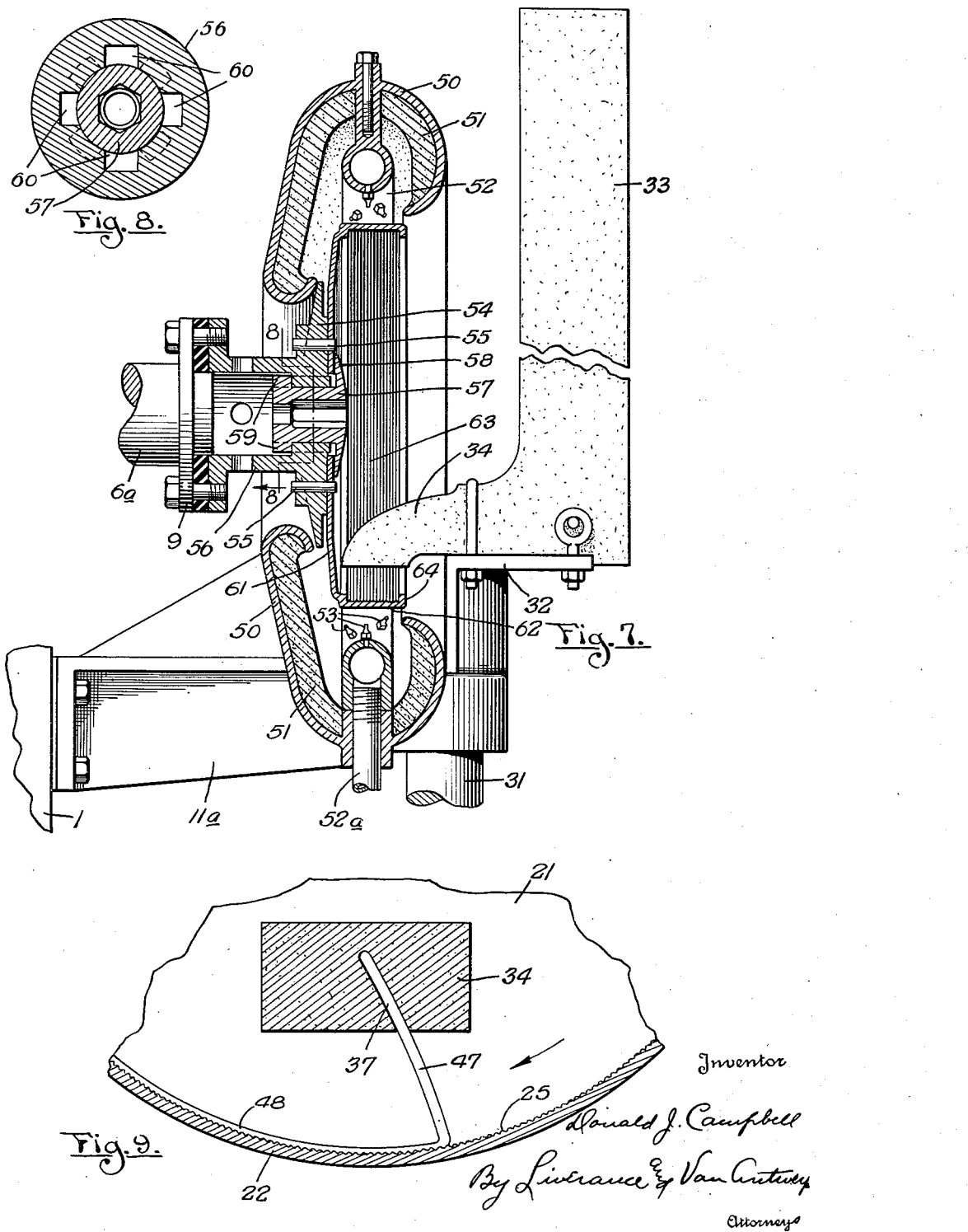

Patented July 6, 1937

2,085,727

UNITED STATES PATENT OFFICE 2,085,727

BRAKE DRUM

Donald J. Campbell, Muskegon Heights, Mich., assignor to Campbell, Wyant & Cannon Foundry Company, Muskegon Heights, Mich., a corporation of Michigan Original application February 2, 1931, Serial No. 512,792. Divided and this application February 3, 1932, Serial No. 590,756

4 Claims. (Cl. 188—218)

This invention relates to a novel construction of brake drum. This application is a division of my prior application, Ser. No. 512,792, filed February 2, 1931, for Centrifugal casting.

It is the primary object and purpose of the present invention to provide a very practical and serviceable brake drum in the form of a composite structure in which an outer formed member of wrought metal which may be pressed or rolled to form or the like, has joined therewith at its inner side a lining ring of cast iron. With this structure there is obtained all of the strength and toughness and resistance to breakage of the outer wrought metal and, at the same time, desirable braking qualities of cast iron.

As disclosed in the application above identified, of which this application is a division, the connection of the cast iron to the pressed or preformed wrought steel drum, is through a process of centrifugal depositing of melted cast iron within the outer drum, which serves as the support against which the metal is deposited and through centrifugal action the melted iron is forced against and into intimate contact with the inner surface of the preformed wrought steel drum, and a complete fused bond between the two ferrous metals is obtained.

It is a further object of the invention to provide a brake drum structure of this character in which the fused bond is substantially complete at all points of contact of the melted cast iron and the preformed wrought steel drum whereby dissipation of heat is uniform and there is not generated excessive temperatures at any portion of the inner surface of the drum which, if they occurred, would be very detrimental.

Many other objects and purposes than those stated will be apparent on understanding of the invention had from the following description, taken in connection with the accompanying drawings, in which, Fig. 1 is an elevation illustrating one form of apparatus with which my method or process may be satisfactorily accomplished.

Fig. 2 is a fragmentary plan view thereof.

Fig. 3 is a fragmentary enlarged section through the outer portion of one form of brake drum having a cast iron inner lining produced with the process or my invention.

Fig. 4 is a fragmentary vertical section on the line 4—4 of Fig. 3.

Fig. 7 is a vertical section, similar to that shown in Fig. 5, illustrating a different form of construction by means of which the process may be attained.

Fig. 8 is a horizontal section substantially on the plane of line 8—8 of Fig. 7, and, Fig. 9 is a fragmentary vertical section illustrating the manner in which the molten iron is directed downwardly and in opposite direction to the direction of rotation of the sheet metal outer shell of the drum.

Like reference characters refer to like parts in the different figures of the drawings.

Figure 5:
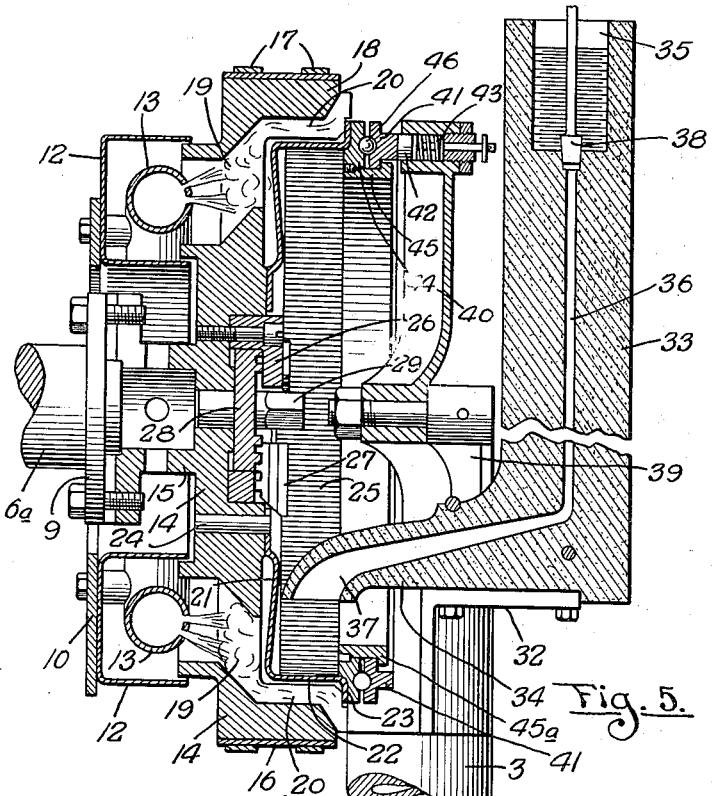
Fig. 5 is an enlarged vertical section substantially on the line 5—5 of Fig. 2 with the parts in closed position and in the position they occupy when the cast iron band is to be cast at the inner side of the brake drum shell.

In the construction of the apparatus shown and by means of which the process may be carried out, a supporting pedestal 1 is used to carry an electric motor 2 on the shaft of which is a drive pulley 3, driving an endless belt 4 which passes around a driven pulley 5 at one end of a driven shaft 6, rotatably mounted on and above the pedestal 1 in bearings 7 which may be water cooled in practice through water circulating therethrough, carried by pipes indicated at 8. The shaft 6 at the end opposite where the pulley 5 is located extends beyond the adjacent bearing 7 and may be enlarged as indicated at 6a terminating in an annular flange 9.

A ring 10 of flat metal has a central opening and is located around said flange 9 (see Fig. 5) and is supported by a bracket 11 fixedly secured to the pedestal. The ring 10 is located vertically and to it an annular housing 12 of sheet metal is secured, together with an annular hollow tubular burner 13 to which gaseous fuel may be continuously carried through inlet pipes 13a, the purpose of which will be hereafter described. The shell 12 serves as a housing for the burner 13 and is of channel shape in cross section with a vertical web secured to the ring 10, and spaced apart horizontal annular flanges between which the burner 13 is located; and the burner at the open side of the housing is provided with a continuous series of small openings for the escape of the fuel which is to be burned as it escapes to produce heat.

Figure 6:
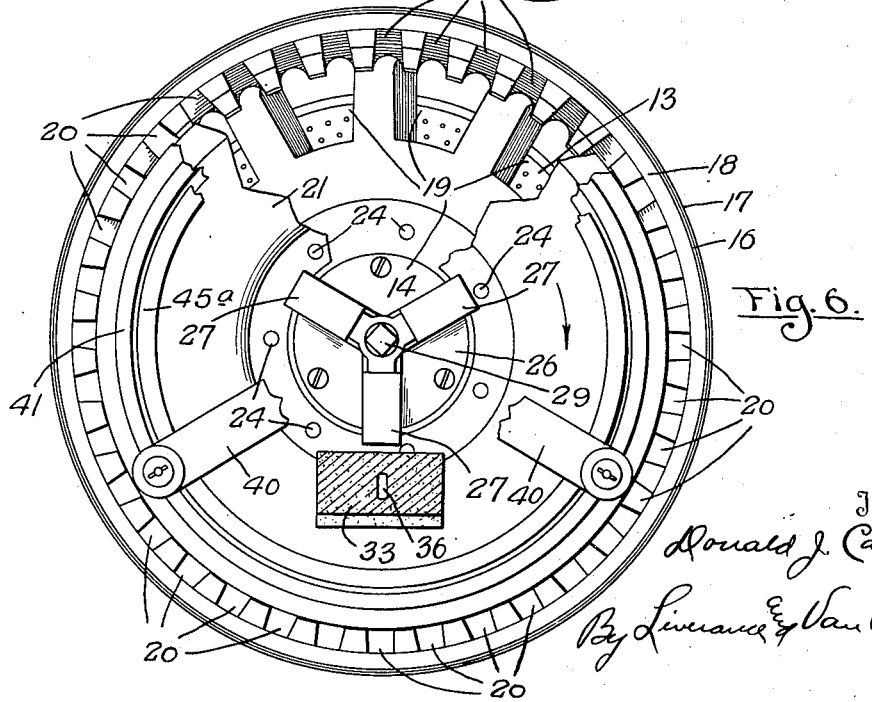
Fig. 6 is an enlarged front elevation of the drum holding die and various parts associated therewith, parts being broken away and shown in section for better disclosure of the construction.

A die 14 of suitable heat resisting material is formed with a cylindrical integral neck 15 which extends toward the flange 9 and terminates in an annular flange which is bolted directly to the flange 9 of the shaft 6. The die is of cylindrical annular form and at its outer side is surrounded by metal bands 16 and 17 as shown. The die at its inner side is formed with a cylindrical shallow recess thereby providing a continuous annular flange 18 for the die around the recess in which the wrought sheet metal outer member of the brake drum is to be seated. The die is also provided with a plurality of spaced apart openings 19 therethrough which join with other spaced apart grooves 20 at the inner side of the flange 18 of the die; and the openings 19 are provided with sides inclined at an angle to the axis about which the die rotates, as indicated in Fig. 6, and the passages 20 are likewise inclined in the same manner, whereby the burning fuel from the burner 13 projecting into said passages 19 and 20 is accelerated in its movement through said passages and the products of combustion at very high temperature are directed against the outer walls of the brake drum shell seated in the die and impact thereagainst heating the shell and maintaining it at a desired high temperature.

The brake drum shell of sheet metal of suitable composition such as steel or the like is rolled or pressed into shape before the cast iron inner band is to be applied thereto. It has a web 21 joined with which is a continuous annular cylindrical drum flange 22 which terminates in an outturned annular lip 23. Many brake drums are of this character of construction, though I have designed another, as will be later apparent, in which a flange is turned inwardly from the free edges of the part 22 instead of outwardly. The web 21 of the shell has a central opening around which a plurality of spaced stud openings are made through which the bolts which attach the drum to an automobile wheel may be subsequently passed. The die 14 is equipped with a plurality of pins 24 which project through the openings in the web 21 to locate the drum shell in proper position with reference to the die and cause it to rotate with the die. In preparation for use in my process also the inner annular surface of the cylindrical drum flange 22 may be serrated continuously around the same as indicated at 25; and while the serrations are shown as parallel to the axis of the drum, it is to be understood that any form of serration or in fact anything which provides a consecutive series of raised points or lines separated by depressions such as may be accomplished by knurling, threading or the like may be used for the same purpose as an equivalent of the serrations shown at 25.

The drum shell formed as shown and described, and having been placed against the die and located with respect thereto by the pins 24 passing through the described openings in the web of the shell, is detachably secured against outward movement. To accomplish this the die 14 is recessed around its central portion and a plate 26 seated and secured in the recess in which a plurality of sliding jaws 27 are slidably mounted to move in and out on radii of the plate 26. The jaws at their inner sides are grooved or threaded to engage with spiral threads and grooves on a circular plate 28 mounted within the recess inside of the plate 26, which plate 28 is connected with a stud shaft 29 provided with a squared outer end whereby it may be turned to thereby radially move the jaws 27 in or out; and when moved outward the ends of the jaws, which are inclined as shown in Fig. 5, bear against the edges of the web 21 of the drum around the central opening therethrough. It is therefore evident that the drum shell is securely yet detachably held in the die and must move with the die in its rotation when the shaft 6 is driven.

A base support or bracket 30 is secured to the pedestal and extends therefrom at the outer end of which a vertical post 31 is connected. A supporting arm 32 is mounted for turning movement at the upper end of the post 31 and carries a stack 33 of suitable heat resistant material at the lower end of which is a laterally projecting arm 34. This stack may be of any desired height and at its upper end portion is provided with a recess or cavity 35 in which a quantity of molten iron may be placed. From the recess or cavity a runner passage 36 extends downwardly through the stack and thence laterally through the arm 34 and at the end of the arm is widened and extended downwardly at an angle as indicated at 37 (Figs. 5 and 9). A stopper 38 may be used between the lower end of the iron receiving cavity 35 and the runner 36.

On an arm 39 extending upwardly from the arm 32 a spider comprising a central sleeve and a plurality of radially extending arms 40 is secured. A ring 41, preferably T-shape in cross section, has a plurality of cylindrical plugs or bosses 42 extending therefrom which pass into openings made through sleeves at the outer ends of the arms 40 to bear against compression springs 43 mounted in said sleeves as shown. A second ring or ring die 44 is located inside of the first ring and is joined therewith by means of an annular ring 45 permanently secured at the inner side of the ring 44 and extending within the outer ring 41, being equipped with an outturned annular lip 45a which engages with a flange of the ring 41. Suitable antifriction ball bearings 46 are located between the two rings 41 and 44.

When the arm 32 with the attached devices described thereon is swung to inner position, the inner ring die 44 bears against the outturned lip 23 of the drum shell, rotates therewith and is pressed thereagainst by spring pressure, while the lower end of the runner 37 lies within the annular cylindrical flange 22 of the drum shell and above the same. Withdrawing the stopper 38 permits the molten metal to pass down the runner 36 and it is projected outwardly, as at 47, Fig. 9, and downwardly at an angle to the inner serrated surface 25 of the drum shell and preferably in a direction in opposition to the direction of rotation of the shell; and with the drum rotating, the molten iron forms a continuous annular band 48 at the inner side of the cylindrical outer flange 22 of the drum through centrifugal action. The arm 32 is provided with a stop 32' to limit its outward movement and it and the bracket 30 have holes 49 (Fig. 2) therethrough through which a pin may be dropped to hold the device at its inner position.

It is evident that such depositing of the melted iron as described results in a continuous radial increase in the thickness of the band of melted iron until the desired amount has been deposited; that such band of melted iron is of uniform thickness due to the centrifugal action and forces generated thereby, and that there is an intimate forced contact of the melted iron with the inner side of the shell, which at the temperatures of the melted iron and shell, hereafter stated, causes the intimate permanent joinder by fusion of the two metals, with an inseparable bond at their contacting surfaces at all points; but because of the limited amount of the melted cast iron used with a shell, and its manner of deposition therein, the outer shell is not affected except at its inner surface where the fusion joinder is made, and there is no change in the physical form or properties of the outer shell during the carrying out of the process.

The drum shell, before it is placed within the die 14, is thoroughly cleaned at its inner surface 25, and may in some cases be nickel or copper plated or plated with various other metals to insure such surface against oxidizing while the drum is being heated, or in some cases a coating may be used to protect against oxidizing or a composition used that will lower the fusing point on the metal contact surfaces, assuring a better interlocking or fusion between the drum shell and the cast iron band. Various compounds, such as red lead, aluminum, thermit or other metal fluxes may be used as well known in the art of welding.

The drum shell, either within the die or before it is placed within the die, is heated to a high degree of temperature the maximum of which should not exceed approximately 1500° F. It is practical to place the cold drum within the die and heat it from the burner 13, the heated products of combustion being projected against the drum and heating it to the required temperature in a very short time, or the drum may be previously heated in a suitable furnace to approximately the desired temperature placed in the die. The die serves to hold the drum to its form as otherwise, particularly when heated to high temperature, the rotation of the drum especially at high speeds has a tendency to enlarge or distort the drum through centrifugal action.

The temperature of the molten metal is very high, reaching at times 3000° F. Under the centrifugal action whereby it is carried with considerable force against the serrated surface 25, and with said surface heated to a high degree of temperature as described, there is a fusion of the molten metal and the adjacent surface portions at the inner side of the drum flange 22 and, particularly, there is a fusion of the higher portions of the serrations with the molten metal. As soon as the desired quantity of molten metal has been deposited within the drum shell, the heat from the burner 13 is discontinued, if the burner has been used, so that the inner cast band 48 and the drum shell cool, the molten metal solidifying and the drum shell contracting thereon as the same cools.

The method may be practical with different apparatus. In Figs. 7 and 8, a hollow annular metal covering 50 is lined with heat resisting material 51, within which an annular burner 52 is mounted, fuel being led thereinto through pipe 52a and projected outwardly and burned at the ends of nozzles 53 located around the inner side of the burner. This device is permanently secured to a bracket 11a extending from the pedestal 1 and is located in axial alinement with the rotation shaft 6a, to the flange 9 of which a drum shell holding member is secured, which includes a head 54, carrying pins 55 similar to the pins 24 previously described, with a flanged cylindrical neck extending therefrom which is permanently secured to the flange 9 as shown. The brake drum shell is located as to position by placing the openings through the web thereof over the pins 55, and is locked in place by a key member 57 having an outer head 58 and a series of projections 59 at its inner end which pass through slots 60 in the head 54 previously described, and may then be turned so as to bring the outer head 58 against the web 61 of the drum shell to hold the same in position and cause its rotation with the shaft 6a.

The drum shell in this case, in addition to the web 61 has an annular drum flange 62 which is serrated or grooved on its inner side with continuous annular spaced apart grooves, as indicated at 63, and the drum flange 62 terminates in an inturned annular lip 64.

The lip 64 forms a retainer for the molten metal which is deposited against the serrated, grooved or roughened inner surface 63, and there is no need for a ring die like or equivalent to the ring 44 which, in the previously described structure, holds the molten metal from flowing outwardly. The molten metal is deposited against the inner surface of the drum shell the same as before, the drum either having been previously heated or heated after it is placed upon the pins 55 to the required degree of temperature, and maintained at this temperature until the molten metal has been deposited. This form of apparatus may be used where the drum shell is of heavier material so that it will not lose its shape from centrifugal action at high speeds of rotation; or where the rotation of the drum is at lesser speeds; or where the temperature of the molten metal deposited therein is of lesser temperatures than the maximum. In all cases, however, the drum shell at its inner side is cleaned and is otherwise treated if necessary to prevent oxidizing and scaling under the temperatures to which it is heated. The molten metal is deposited preferably under the combined influence of gravity and hydrostatic pressure, and, preferably, in a direction opposite the direction of rotation of the shell and, with the pressures produced by centrifugal forces and with the high temperatures of shell and melted metal, there is accomplished fusion of the shell at its inner sides with the molten metal and a contraction of the shell against the cast iron wearing ring or band within it in cooling.

The brake drum produced is one of great practical utility. All of the advantages in the matter of strength, toughness and the like of steel are combined with all of the advantages of cast iron as a wearing and braking surface, and the disadvantages of each if used alone are eliminated. The requisite and necessary lightness in weight is attained which would be impossible if cast iron alone were used and all of the advantages of cast iron in any of its various compositions which may be used for a braking surface are secured. The invention has been extensively tested and has proven completely satisfactory in all respects.

It is also apparent that, by reason of the centrifugally cast band and the manner in which the metal is applied to the shell, that all gas, air scale, dirt and the like being of lighter specific gravity come to the inner side of the cast metal ring and either go into the atmosphere, or collect as a scale when the ring solidifies; and that the metal of the band is of denser nature toward the surrounding drum shell, and progressively decreases in density toward the inner side of the band, there being graduations of metal between the inner side of the cast metal band and the outer portions where it is fused to the surrounding shell. This is of value in conjunction with the brake drum, as with any wear on the cast metal brake band, the metal remaining becomes of a better rather than a worse quality.

The invention is to be understood as comprehensive of what is defined in the claims and not limited in any sense to particular apparatus used or otherwise than as required by the claims defining the invention.

What I claim is:—

1. A brake drum or the like, comprising a preformed cylindrical supporting shell of wrought steel, an inner lining ring of cast iron within the shell, there being a continuous connecting zone of intermixed iron and steel between the steel shell and the cast iron ring, of the type formed by the deposit against the shell of molten iron at a temperature above the melting point of the steel.

2. A brake drum or the like, comprising a preformed cylindrical supporting shell of wrought steel, an inner lining ring of cast iron within the shell, there being a continuous connecting zone of intermixed iron and steel between the steel shell and the cast iron ring, of the type formed by the deposit against the shell of molten iron at a temperature above 2700° F.

3. A brake drum or the like, comprising a preformed cylindrical supporting shell of wrought steel, an inner lining ring of cast iron within the shell, there being a continuous connecting zone of interknit iron and steel between the steel shell and the cast iron ring, of the type formed by the deposit against the shell of molten iron at a temperature above the melting point of the steel.

4. A brake drum or the like, comprising a preformed cylindrical supporting shell of wrought steel, an inner lining ring of cast iron within the shell, there being a continuous connecting zone of intermixed iron and steel between the steel shell and the cast iron ring, of the type formed by the deposit against the shell of molten iron at a temperature above the melting point of the steel, the iron and steel in the connecting zone being respectively integral with and part of the steel of the shell and the iron of the lining ring.

DONALD J. CAMPBELL.